(12) United States Patent
Balestrino et al.

(10) Patent No.: US 8,048,276 B2
(45) Date of Patent: Nov. 1, 2011

(54) ELECTROLYSIS APPARATUS

(75) Inventors: Cristiano Balestrino, Derby (GB);
Gerard D. Agnew, Derby (GB);
Michele Bozzolo, Derby (GB)

(73) Assignee: Rolls-Royce plc, London (GB)

( * ) Notice: Subject to any disclaimer, the term of this patent is extended or adjusted under 35 U.S.C. 154(b) by 579 days.

(21) Appl. No.: 12/081,795

(22) Filed: Apr. 22, 2008

(65) Prior Publication Data

US 2008/0289955 A1 Nov. 27, 2008

Related U.S. Application Data

(63) Continuation of application No. PCT/GB2006/003614, filed on Sep. 29, 2006.

(30) Foreign Application Priority Data

Oct. 28, 2005 (GB) .................................. 0521984.5

(51) Int. Cl.
*C25B 9/08* (2006.01)
*C25B 1/04* (2006.01)

(52) U.S. Cl. ........ 204/237; 204/266; 204/252; 205/628; 205/629

(58) Field of Classification Search .................. None
See application file for complete search history.

(56) References Cited

U.S. PATENT DOCUMENTS

| 3,993,653 | A | * | 11/1976 | Blum et al. ................... 204/272 |
| 4,087,976 | A | * | 5/1978 | Morrow et al. ................ 60/643 |
| 5,312,699 | A | | 5/1994 | Yanagi |
| 5,479,462 | A | | 12/1995 | Yamauchi |
| 7,491,309 | B2 | * | 2/2009 | Peter et al. ................... 205/629 |
| 2003/0012997 | A1 | * | 1/2003 | Hsu ................................ 429/34 |
| 2006/0065545 | A1 | * | 3/2006 | Balan et al. ................... 205/628 |
| 2007/0138022 | A1 | * | 6/2007 | Peter et al. ................... 205/628 |

FOREIGN PATENT DOCUMENTS

| JP | 03 208 259 A | 9/1991 |
| JP | 08 127 888 A | 5/1996 |
| WO | PCT/GB2003/004089 A2 | 4/2004 |

OTHER PUBLICATIONS

Liepa et al, High Temperature Steam Electrolysis: Technical and Economic Evaluation of Alternative Process Designs, International Journal of Hydrogen Energy, vol. 11, Issue No. 7, pp. 435-442, 1986.*

* cited by examiner

*Primary Examiner* — Harry D Wilkins, III
(74) *Attorney, Agent, or Firm* — Jeffrey S. Melcher; Manelli Selter PLLC

(57) ABSTRACT

Solid oxide stacks used as fuel cells generate electricity from hydrogen or other sources. By an electrolysis process such standard fuel cells can be operated in order to create hydrogen or other electro chemical by-products. Unfortunately stacks generally operate at relatively high temperatures which will be difficult to sustain purely on economic grounds. In such circumstances less efficient operation can be achieved at lower temperatures where the air-specific resistance is higher by balancing with the electrical power input in order to cause the disassociation required. In such circumstances by provision of an incident heat source, whether that be through a heat exchanger heating the compressed air flow, or recycling of a proportion of exhaust from the stack, or combustion of a product from stack disassociation the result will be a sustaining electrolysis operation reducing the amount of expensive electrical supply required to achieve dissociation.

28 Claims, 4 Drawing Sheets

ELECTROLYSIS APPARATUS

CROSS-REFERENCE TO RELATED APPLICATIONS

This application is a continuation of International Application No. PCT/GB2006/003614, filed Sep. 29, 2006, designating the United States. This application also claims foreign priority under 35 U.S.C. 119 and 365 to United Kingdom patent application No. 0521984.5, filed Oct. 28, 2005.

BACKGROUND OF THE INVENTION

The present invention relates to electrolysis and for example utilisation of fuel cell technologies in order to generate hydrogen as a fuel for other uses.

Electrolysis apparatus is known for a number of applications and it is proposed to use water electrolysis as a simple and clean technology for hydrogen production. Electrolysis is the reverse process to fuel oxidation in fuel cells. A schematic of the process is illustrated in FIG. 1. In an electrolysis process steam is dis-associated on a cathode with formation of hydrogen molecules. In solid oxide cells the cathode reaction is as follows:

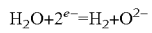

Oxygen ions migrate through the electrolyte forming oxygen molecules on the anode surface with the release of electrons.

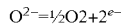

The overall steam electrolysis reaction is then as follows:

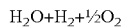

In the above circumstances it will be understood that an electrical power source is required to draw electrons from the anode to the cathode overcoming the electrochemical reaction potential.

Although commercial water electrolysis is available at low temperatures through use of known technology the efficiency of operation for these electrolysers is relatively low. Use of high temperature fuel cell technology is inhibited by the necessity for such high temperature fuel cells to operate at temperatures in excess of 800° C. and typically in a range 800° C.-1000° C. In such circumstances it is necessary to use specific heaters which diminish effectiveness and practicability of such approaches.

Currently the most developed technology with regard to hydrogen production is related to steam re-forming. In this process a fossil fuel source is utilised and this contributes significantly to $CO_2$ emissions. Water electrolysis is proposed as a "green house gas free" hydrogen production technology allowing utilisation of non fossil fuel electricity sources such as nuclear or renewable electrical power sources. Unfortunately there is a significant disadvantage with current hydrogen production via water electrolysis in that, as indicated above, there is a relatively low efficiency. Such low efficiency necessitates the use of a relatively high electricity consumption rate rendering the costs of the hydrogen produced by water electrolysis as too expensive for commercial viability relative to that currently produced through steam re-forming. It will also be understood that the equipment cost for current water electrolysers is high again significantly contributing to making water electrolysis the more expensive option for hydrogen production when compared to steam re-forming of natural gas or other hydro carbons.

SUMMARY OF THE INVENTION

In accordance with one aspect of the present invention there is provided an electrolysis apparatus for production of a product, the apparatus comprising an electrolysis cell generally operable at 800-1000° C. to provide electrical power by oxidation but arranged to provide the product at a cathode in a stack by electrolysis, the electrolysis cell used to generate the product by presentation of a feed and an air feed with electrical power presented by a power source between the anode and cathode, the apparatus characterised in that air for the stack is pre-heated before presentation to the electrolysis cell using an incident heat source.

Also in accordance with another aspect of the present invention there is provided a water electrolysis apparatus for production of hydrogen, the apparatus comprising an electrolysis cell generally operable at 800-1000° C. to provide electrical power by oxidation of hydrogen but arranged to provide hydrogen product at a cathode in a stack by electrolysis, the electrolysis cell used to generate the hydrogen product by presentation of a steam feed and an air feed with electrical power presented by a power source between the anode and cathode, the apparatus characterised in that air for the stack is pre-heated before presentation to the electrolysis cell using an incident heat source. Generally, the electrolysis cell is an electrochemical cell such as a fuel cell.

Typically, the incident heat source is provided by processed heat from the power source or other process. Possibly, the incident heat source is provided by combustion of a proportion of the product generated.

Possibly, the air is compressed and pre-heated to a temperature of 500-800° C.

Possibly, a small proportion of the product generated is presented at the cathode to maintain a reducing capability.

Typically, a proportion of the air coming out of the stack is re-circulated into the stack.

Typically, the air is driven towards the stack by a turbine engine.

Typically, the air is heated by a heat exchanger. Possibly, a recovery arrangement is provided to receive heat from a gas turbine engine exhaust to generate the incident heat for the stack.

Typically, a separator is provided to separate product flows from the stack.

Possibly, a super heater is provided in order to recover heat for heating of the feed presented to the stack.

BRIEF DESCRIPTION OF THE DRAWINGS

Embodiments of the present invention will now be described by way of example and with reference to the accompanying drawings in which:—

DETAILED DESCRIPTION OF THE INVENTION

Operation of solid oxide fuel cell systems is known and an example is given in international patent application No. PCT/

GB 2003/004089 (Rolls Royce Plc). In these arrangements an electrolysis cell or electrochemical cell in the form of a fuel cell stack is provided which comprises an electrolyte sandwiched between an anode and a cathode in order to consume hydrogen by oxidation in order to generate electricity. The apparatus relates to utilising electrolysis in electrolysis cells such as electrochemical cells in order to act for example as electrolysis apparatus to generate hydrogen to be used as a fuel itself. It will be understood that hydrogen can be used as a fuel in automotive vehicles and otherwise in order to create an energy source for a prime mover in such vehicles or machinery. Hitherto the cost of hydrogen has been relatively high particularly if produced by water electrolysis using fuel cell technologies. In such circumstances the advantages of low emissions from hydrogen fuel cell technologies in relatively small machinery and automobiles has been questionable in view of the economic penalty.

Figure 2:
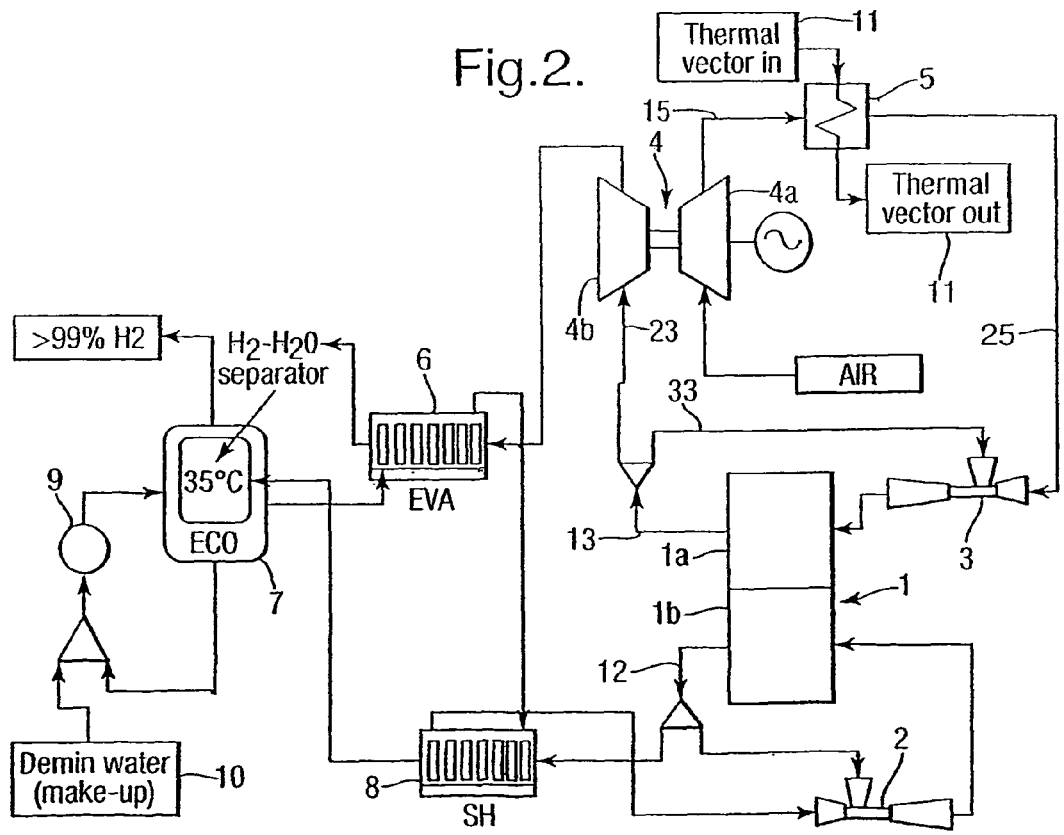
FIG. 2 is a schematic illustration of a first embodiment of a water electrolysis apparatus in accordance with certain aspects of the present invention.

FIG. 2 provides a schematic illustration of a first embodiment of a water electrolysis apparatus in accordance with certain aspects of the present invention. This embodiment and other embodiments are given as examples and the approach described may be utilised in respect of electrolysis apparatus to produce products other than hydrogen. Thus, a stack 1 comprises an anode portion and a cathode portion to which compressed air is provided from the ejector 3 and steam from an ejector 2 are respectively presented. Operation of the water electrolysis apparatus will be described below, but it will be appreciated that by reversal the present invention utilises a typical solid oxide fuel cell construction with minimal modifications.

The stack 1 as indicated compromises a solid oxide electrolyte with an anode side and a cathode side. In such circumstances compressed air from the ejector 3 is directed towards the anode 1a in the water electrolysis embodiment in accordance with one aspect of the present invention. This would be the cathode in a fuel cell operation. The compressed air presented to the anode 1a will be at a temperature higher than 700-800° C. in order to facilitate electrochemical cell operation in an electrolysis mode. The feed to the cathode side 1b (the anode in fuel cell operation) consists of high temperature super heated steam presented to the ejector 2. A small fraction typically about 10% of the disassociated hydrogen may be provided to the cathode in order to meet water electrolysis cell requirements. The water undergoes electro chemical reaction within the stack 1 and hydrogen molecules are generated. It will be understood that disassociated oxygen ions migrate through the electrolyte layer in the stack 1 and air on the anode side is therefore enriched in oxygen content. Typically, the steam utilisation factor will be in the order of 0.85 which means that the steam content in the hydrogen rich mixture at the cathode outlet is in the order of 15'. It will be understood the electrolysis apparatus simply requires switching the anode and cathode from the fuel cell arrangement operation and providing different feeds to the anode and cathode so that in terms of cell and stack design, geometry and scale there will be no serious or major modifications required from the base fuel cell configuration. Typically, the stack 1 will be provided within a pressured vessel.

As indicated above, the ejector 2 for the steam feed to the stack 1 will generally arrange for re-circulation of a small fraction of the produced hydrogen rich mixture 12 presented at the cathode 1b inlet. The small amount of hydrogen is needed in order to ensure that the cathode 1b inlet is kept as a reducing environment and avoids oxidation by traces of oxygen entrained in the steam feed to the stack from the ejector 2 as a result of imperfect water de-mineralisation and/or air leakages in the steam feed line.

The ejector 3 as indicated, presents compressed heated air to the anode 1a of the stack 1. Generally again, there is re-circulation of a fraction of the oxygen enriched air coming from the stack 1. The bulk of the air coming from the stack 1 will be at relatively high temperature and the air drives a turbine 4. The turbine 4 is used to entrain secondary flow from the stack 1 in order that there is a low pressure-drop in the air recycle loop 33 due to the absence of an internal reformer and off gas combustor. In such circumstances the same recycle ratio as in a typical fuel cell operation may be used with a lower pressure drop between the primary inlet, that is to say a lower pressure drop between the compressor 4a and the turbine 4b. It will be understood that the rotation of oxygen enriched air passing through the recycle loop 33 to the ejector 3 will be at a high temperature so that this recycled air will increase the compressed air feed temperature to the anode 1a reducing the capacity and demand upon the heat exchanger 5 to elevate the compressed air feed to the stack 1.

As indicated above, a gas turbine engine is used to pressurise the air feed to the stack. High temperature products from the anode 1a side of the stack are directed to the turbine 4b which drives the compressor 4a in order to cause pressurisation of the air feed as described. It will be understood that excess power from the turbine 4 may be used to drive an alternator for electrical power which in turn may decrease the electrical power consumption on a power source for the system. As indicated above, in order to drive the electrochemical reaction in the stack 1 it is necessary to provide electrical power across the anode and cathode. This power source may be a nuclear reactor.

As indicated above, the heat exchanger 5 is provided to give the necessary heat input to the compressed air flow into the stack 1. Increased air feed temperature will facilitate the electrolysis process. In such circumstances air 15 from the compressor 4a is led to the cold side of the heat exchanger 5 whilst an external thermal vector is supplied to the hot side of the heat exchanger 5. The thermal vector can be derived from a number of processes either from incidental heat generated by the electrical power source for the apparatus, e.g. a nuclear power reactor or other process heat incident or conveniently available to the electrolysis apparatus or through combustion of a proportion of the hydrogen enriched flow. It will be understood that an extremely high temperature is not required allowing a wide range of potential sources for the thermal vector utilised by the heat exchanger 5 in order to increase the temperature of the air 15 as subsequently presented to the ejector 3 through a feed 25. As can be seen, the thermal vector 11 is presented in a conventional fashion across the heat exchanger 5 and may be re-circulated if required.

With regard to the thermal vector it will be appreciated that if the present apparatus is integrated with a high temperature nuclear reactor then an intermediate helium circuit within that reactor may be needed between the primary reactor coolant loop and the present electrolyser apparatus for the following reason. Direct use of primary reactor coolant would result in too high a temperature for the exchanger 5 and so could create fundamental safety issues and additional problems with respect to radiation protection. Design of a two step heat exchanger would allow mitigation of the effects of the elevated pressure difference between the primary coolant loop in the reactor which will typically be in the order of 40-70 bar and the pressure of air in the electrolyser cycle which will typically be in the order of 7 bar.

The presence of an air re-circulation cycle through the recycle loop 33 means that the necessary pre-heating of the primary air 15 in the heat exchanger may be sufficient if it is only in the range of 500-600° C., thus allowing for the design of a compact recuperative type heat exchanger 5 to provide the necessary heat input to the system for operational efficiency. Furthermore, terminal temperatures allow use of state of the art metallic materials for the construction of the heat exchanger 5 without the need for ceramic materials which can create problems.

As indicated typically a fraction of the air from the compressor may bypass the intermediate heat exchanger and be used as a coolant to the inner wall of a pressurised vessel containing the stack 1.

Normally a steam evaporator 6 is provided in the present apparatus to receive heat from the gas turbine 4b exhaust. This recuperated heat is then utilised in order to generate the heat for steam feed to the stack 1.

A steam super heater is typically utilised to exploit the heat from the steam released from the cathode 1b side of the stack 1. Normally this super heater will be located outside of a containment vessel for the stack 1 and will consist of a standard steam super heater with a maximum steam temperature up to 500-550° C. Additional steam super heat prior to feeding to the stack will be required. This can be achieved through internal heat exchange within the pressure vessel.

A water condenser and separator 7 is provided for the hydrogen enriched mixture produced by the stack 1. The heat released in off gas cooling and steam condensation is exploited for water heating. It will be understood that de-mineralised water is important with regard to the present electrolysis apparatus so that in order to reduce the requirements for de-mineralisation in the water electrolysis cycle water condensed in the condenser 7 is recycled and mixed with "make up" water in the apparatus. It will be understood that dependent upon the size and arrangement of the electrolysis cycle additional waste heat from a further heat cooler may be required to achieve an assumed 35° degrees in the temperature in the condenser separator and obtain the desired water condensation and hydrogen purity, that is to say greater than 99%.

In order to drive circulation a feed pump 9 to pressure the water feed to the steam generation equipment is provided. This pump 9 will generally create a pressure in the water in excess of 10 bar. Furthermore, as indicated above, de-mineralisation and de-aeration of feed water is important with regard to the present water electrolysis process and in such circumstances a de-mineralisation/de-aeration unit 10 is provided for the water to generate the steam.

Figure 1:
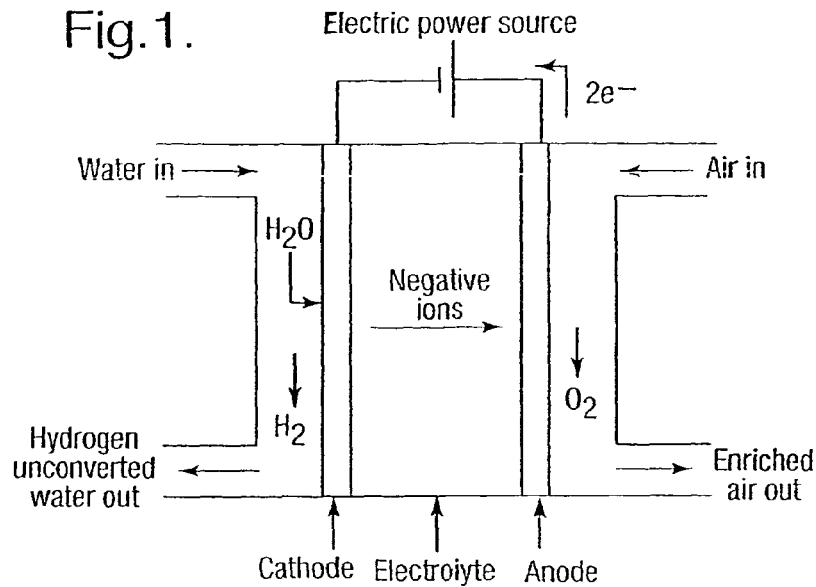
FIG. 1 is a schematic illustration of an electrolysis process.

It will be understood that the heat input to the heat exchanger 5 represents a key constraint upon the apparatus illustrated in FIG. 1 especially with regard to use of an intermediate heat exchanger. Lower outlet temperature from heat exchanger 5 allows a more compact design, although effectiveness is reduced. It will also be understood a very hot air feed to the pressure vessel containing the stack 1 will itself cause problems with respect to acceptable materials and costs. However, as indicated above, it is using incidental heat sources which can be used to increase the compressed air feed temperature to the stack which is of importance with regard to the present invention. In such circumstances a two step heat exchange process can be provided consisting of a recuperator type heat exchanger at the compressor for an output and a high temperature heat exchanger within the pressurised vessel. Although this approach would require the design of a critical heat exchanger and hot line to feed the pressure vessel.

It will be understood the heat generation due to power dissipation within the stack 1 reduces the required primary air temperature to the water electrolysis cycle for sustained operation. The stack 1 area specific resistance (ASR) generally increases with decreased temperature thus increasing the internal heat generation in the stack 1 will compensate for any reduction in the heat input through the intermediate heat exchanger. It will be understood that heat is released from the stack 1 due to ohmic losses and is recycled to the stack 1 through the air recycling loop 33.

In comparison with fuel cell operation the water electrolysis cycle of the present apparatus requires lower air flow rates per stack 1 due to the endothermic nature of the water electrolysis reaction which tends to decrease the outlet temperature of air 13 from the stack 1. In such circumstances where the same turbine 4 is used in a hybrid system, that is to say a configuration which allows both fuel cell and water electrolysis operation then the same total air mass flow rate to the stack is equated. It is advantageous to increase the amount of stack 1 to be fitted in each pressure vessel to increase the average air temperature in the stack 1 and the efficiency of the chemical reaction. Nevertheless, this operation is limited by the maximum amount of reproducible steam by heat recovery from the gas turbine exhaust and that consumed by the stack 1.

It can be shown that decreasing primary air temperature to the stack 1 will also lower average stack 1 temperature which in turn, as indicated above, will increase the stack 1 area-specific resistance (ASR) and so increases the ohmic heat generation within the stack 1 and the air temperature increases as it passes back to the stack 1 through the recycle loop 33. In such circumstances air recycling mitigates any decrease in the air inlet temperature to the stack 1.

It can also be shown that the overall effect of air outlet temperature from the exchanger 5 can be minimal provided there is air recycling as described, thus the benefit of reducing the temperature in terms of feasibility and cost effectiveness of the apparatus is more readily achievable. It will also be understood that whilst there is an overall objective to reduce the air-specific resistance (ASR) value for the fuel cell modules in order to achieve high efficiency levels with regard to water electrolysis apparatus performance is less sensitive to this parameter which can simply be adjusted through variance as in the required electrical power across the anode and cathode as well as thermal power inputs to the system such that it is possible to achieve a substantially consistent performance. In such circumstances the relatively costly electricity input can be compensated by use of incidental process heat if available in order to reduce the amount of expensive electricity used in comparison with cheaper incidental heat such as process heat or otherwise for heating the air input will be beneficial. It will be understood that generally heat input is always far cheaper than electric power across the anode and cathode.

Figure 3:
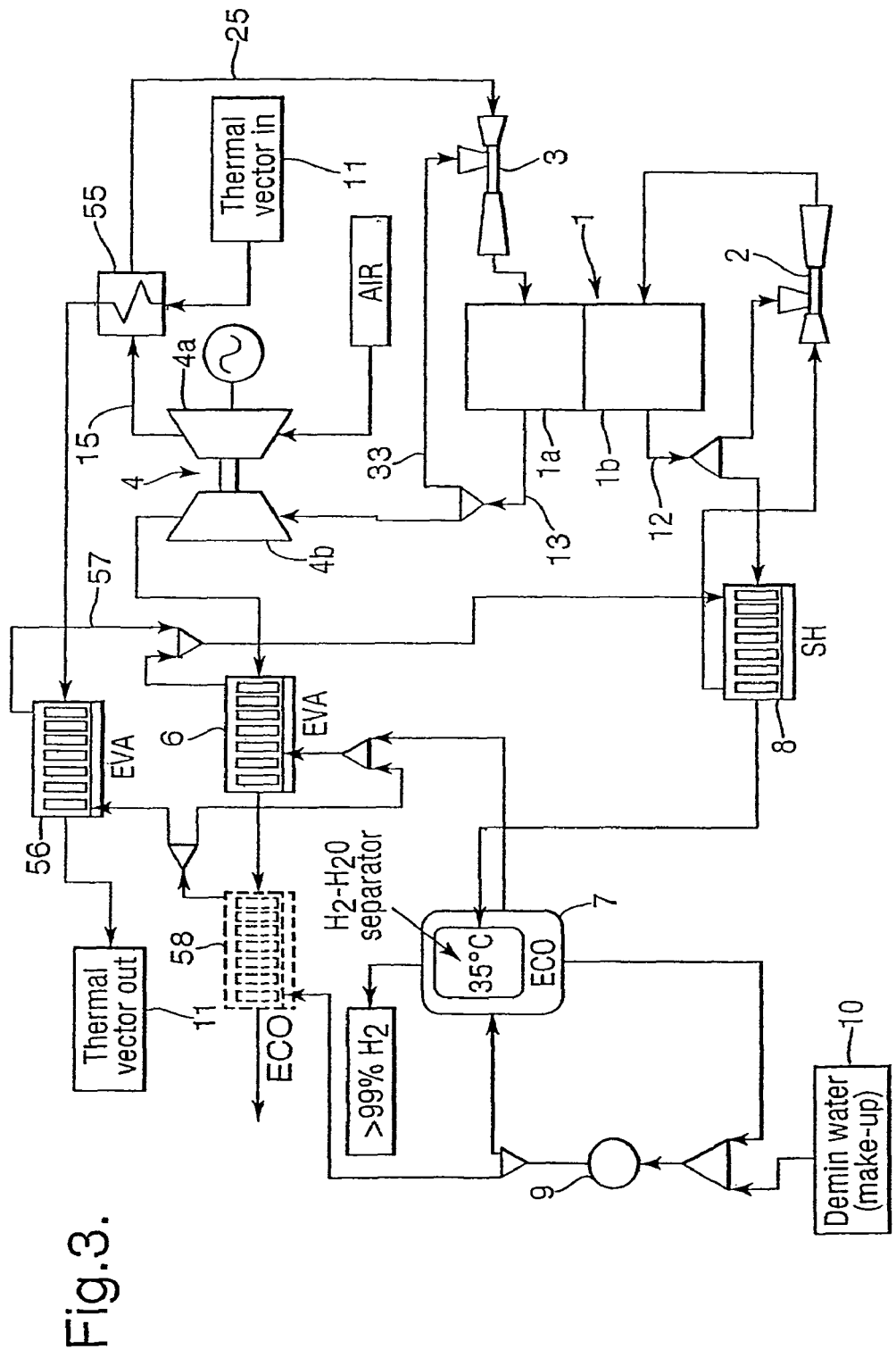
FIG. 3 is a schematic illustration of a second alternative water electrolysis apparatus in accordance with certain aspects of the present invention.

The amount of compressed air flow per stack 1 is limited by the maximum, producible steam flow rate from the internal heat recuperation process within the water electrolysis cycle, that is to say recovery at the gas turbine outlet. An alternative or second embodiment of a water electrolysis apparatus is depicted in FIG. 3 in which additional steam generation capacity is provided by exploiting heat taken from a heat exchanger 55 utilised in order to provide heat for steam generation. It will be understood that the temperature at the outlet from the heat exchanger 55 will generally be in the range of at least 350-400° C. to allow sufficient approach to delta T to the input temperature of the air coming from the compressor.

In FIG. 3 like for like components are similarly numbered to those referenced in FIG. 2 and additional description provided by additional features of this second embodiment. In such circumstances by use of the output heat from the heat exchanger 55 it will be understood that (the amount of stack 1 per unit area up to a limit imposed by other technological constraints is achieved thus allowing the stack 1 to operate at higher average temperatures, lower area-specific resistance (ASR) and higher efficiency. The water electrolysis cycle depicted in FIG. 3 should be compared with that depicted in FIG. 2 as an additional steam generator is provided receiving further process heat. Thus, heat from the heat exchanger 55 is presented to a steam evaporator 56 to generate further steam 57 in addition to that provided by evaporator 6. Such that, as indicated above, the steam generation capacity of the apparatus depicted in FIG. 3 is significantly greater than that depicted in FIG. 2. It will also be understood that greater efficiency is achieved by further recovery of process heat through the heat exchanger 55 and evaporator 56. In order to further improve efficiency an additional heat recovery economiser 58 may be provided for feed water pre heating before evaporation in the evaporators 6, 56. This economiser 58 may be placed in order to receive heat from the turbine 4 exhaust or through an independent thermal process heat source.

As indicated above by utilisation of incident heat sources whether they be from the mechanism by which electrical power is generated for the water electrolysis, or adjacent processes to a water electrolysis apparatus, it is possible to adjust the compressed air feed to the electrolysis apparatus. Furthermore, by provision of a recycle for a proportion of the outlet air from the stack it is possible to maintain stack air feed temperatures to that acceptable for efficient operation. In such circumstances the twin balancing processes of electrical power as well as temperature of the air feed/steam can be relatively adjusted in order to achieve the desired water electrolysis efficiency of operation in order to generate fuel quality hydrogen.

The present water electrolysis apparatus has several intrinsic features as outlined below.

A) The endothermic nature of the electrolysis reaction compensates for heat generation by ohmic losses in the stack 1. This reduces the temperature gradients within the stack 1 if compared to the fuel cell mode of operation reducing thermal stresses which are typically a key problem with respect to high temperature fuel cell operation. Through balance of the electrical power input as well as temperature of feeds, it is possible to approach isothermal stack operation in certain circumstances.

B) Through use of a lower temperature for the air feed to the stack inlet there is a smoothing in the increase of area-specific resistance (ASR) and heat generation by the stack 1 ohmic losses. Through use of a recycle loop 33 the overall effect upon apparatus efficiency is very low.

C) Specific targets with respect to area specific resistance (ASR) for the stack 1 have a very limited effect upon the water electrolysis apparatus performance. Due to the temperature dependence relation of air-specific resistance, a stack have a nominal 30% higher air-specific resistance than the target values would operate at higher average temperatures increasing ohmic losses resulting in an actual increase in the area-specific resistance (ASR) limited to about 10% and almost constant system efficiency. This increase in ohmic losses as indicated increases the air temperature exhausted from the stack 1 and a proportion of that is then recycled the loop 33 to regulate the air feed presented through the ejector 3. It will also be understood that the maximum stack 1 temperature and turbine inlet temperature are however kept well below allowable limits.

D) Exceeding hydrogen leakage targets with respect to the stack will have limited effect on apparatus performance. Higher leakage would bring a higher stack operating temperature but still within maximum allowed values which would lower area-specific resistance (ASR).

E) Little modification is required to existing fuel cell structures in order to achieve water electrolysis operation.

It will be appreciated that typically several stacks 1 are provided within an apparatus to provide water electrolysis with appropriate piping and ducting between the components.

Figure 4:
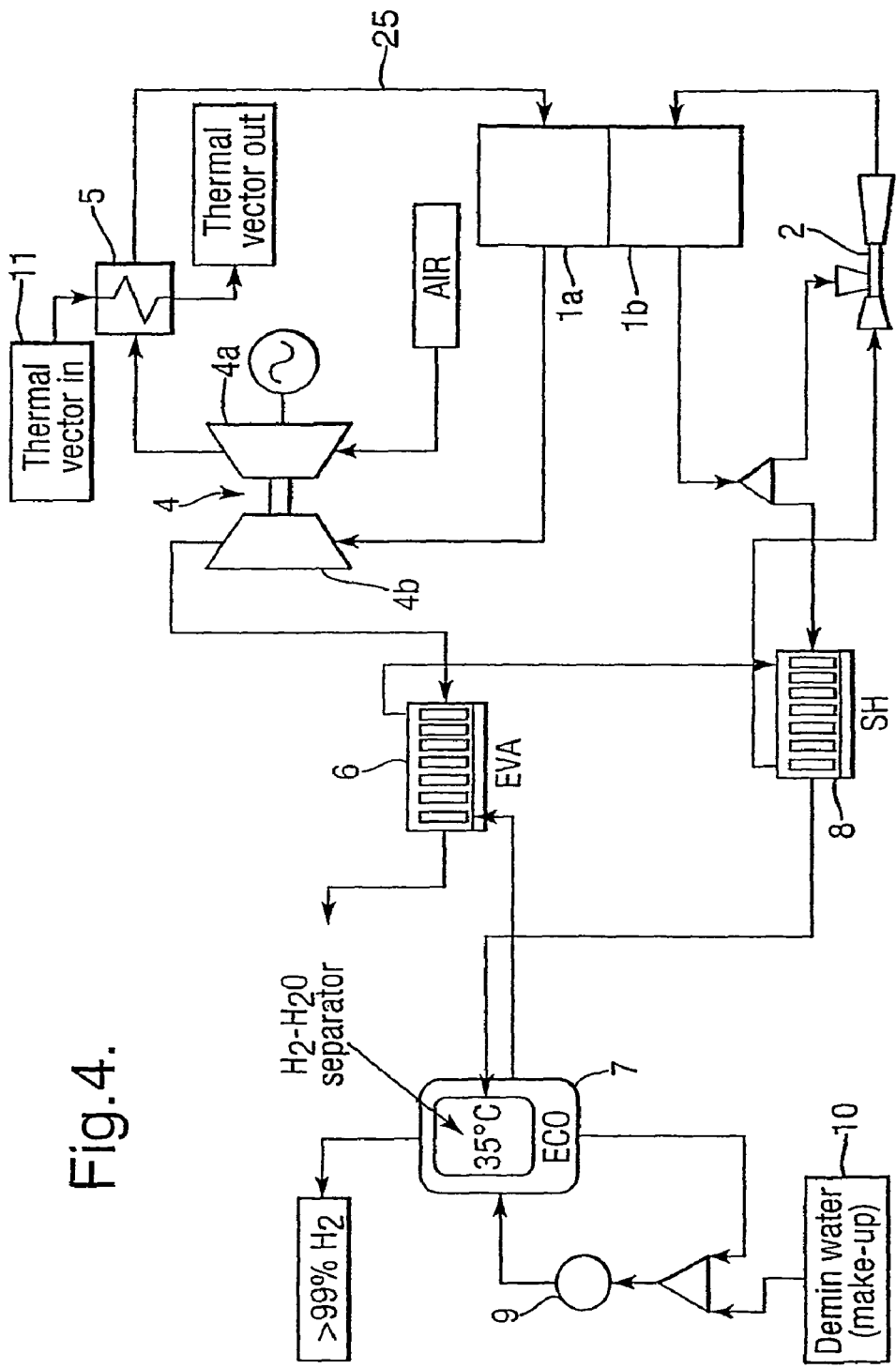
FIG. 4 is a schematic illustration of an open loop cycle electrolysis apparatus adapted in accordance with certain aspects of the present invention; and, FIG. 5 is a schematic illustration of a fifth embodiment of a water electrolysis apparatus in accordance with certain aspects of the present invention.

FIG. 4 schematically illustrates an open loop electrolysis apparatus. This apparatus as indicated is open loop with no air recycling from the stack 1 to the feed for the stack. In such circumstances, as previously, the stack 1 is formed by oxide electrolysis cells between an anode side 1a and a cathode 1b. The ejector 2 again provides for cathode recycling to provide hydrogen at the cathode side 1b. A gas turbine engine 4 is provided in order to provide and compress air 25 fed to the anode 1a. An intermediate heat exchanger 5 with an appropriate thermal vector provided by incident processed heat acts so that the air 25 is preheated to the electrolysis cell stack. A steam generator 6 receives heat from the turbine 4 exhaust in order to generate steam through evaporation. A condenser 7 for water entrained in the water electrolyser apparatus product acts as an economiser to a water/steam feed to the water electrolyser. A steam super heater 8 is provided to circulate steam through the ejector 2 into the cathode 1b. As previously, there is a feed pump 9 and de-mineralisation/de-aeration apparatus for use with respect to the water used in the water electrolysis process.

In the above circumstances in comparison with the previous embodiments depicted in FIGS. 2 and 3, it will be noted that there is no air recirculation loop (33 in FIGS. 2 and 3). In such circumstances the apparatus depicted in FIG. 4 is more sensitive to the temperature of air at the exchanger 5. Since this temperature is the same as the stack inlet temperature of the air in the cycle arrangement the minimum allowable value is 750-800° C. This makes more critical the design of the intermediate heat exchanger 5 which needs to provide the dual functions of a recuperator type heat exchanger external to the pressurised vessel containing the stack 1 for low temperature heat exchange and a high temperature heat exchanger internal to the pressurised vessel. This would require design of a hot line for a thermal vector which, in most cases, will be taken from a nuclear plant, to feed to the pressurised vessel with consequent considerations with respect to safety in design.

Use of a two step heat exchanger now achieves the heat transfer effect to the air with two low efficiency heat exchangers. However, with this open cycle arrangement, although achievement of a higher ratio between a thermal and electrical input to the system, it will generally provide less efficient than one involving air recycling (FIGS. 2 and 3) and more importantly would require a complete system re-design from an existing fuel cell operative arrangement.

Figure 5:
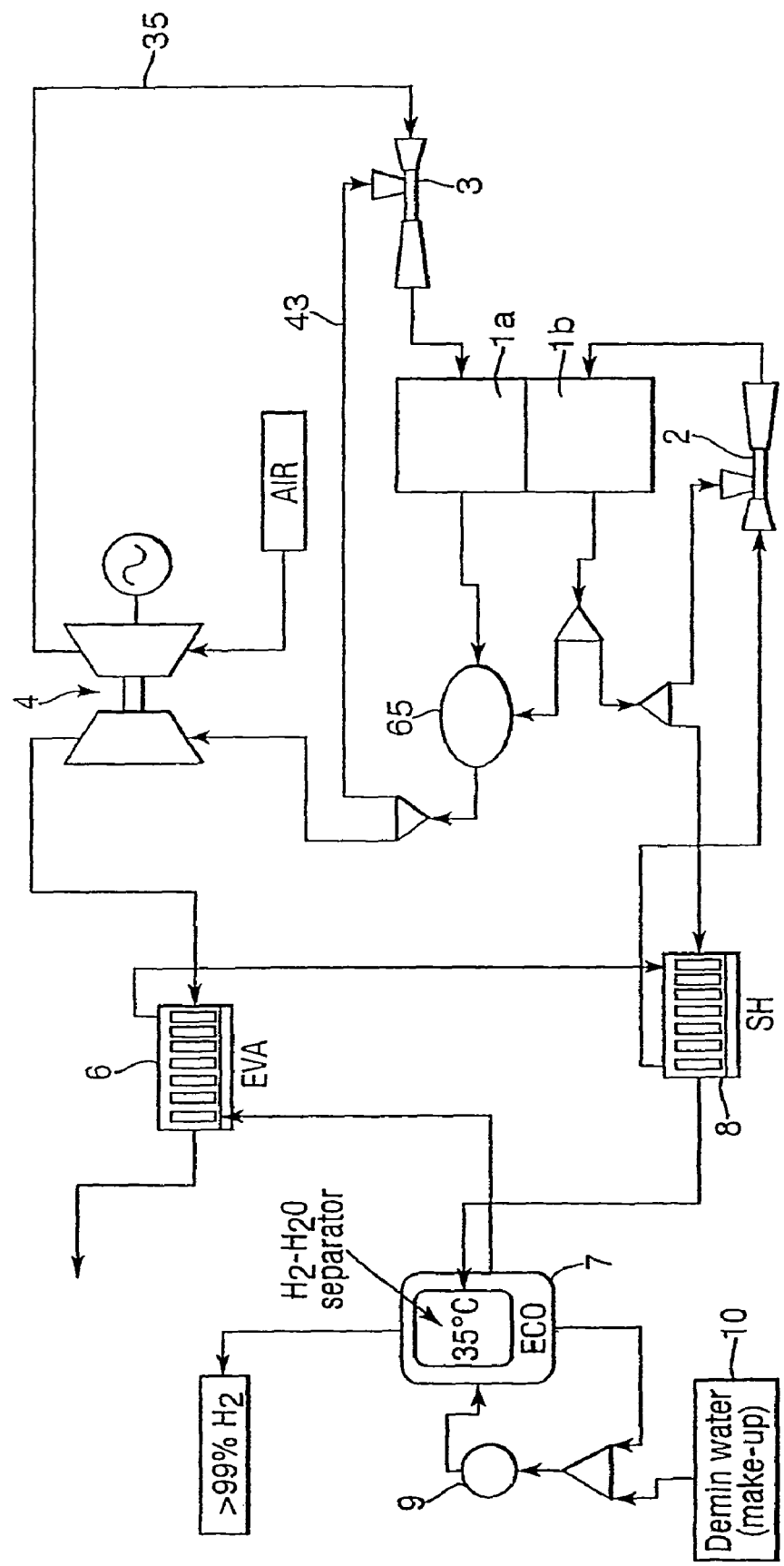

FIG. 5 provides a further fourth alternative embodiment of an electrolysis apparatus in accordance with certain aspects of the present invention which removes the need for an external heat exchanger or heat source and instead provides heat for heating the compressed air presented to the stack 1 through burning a small fraction of the produced hydrogen in the air recycle loop 43. Thus, a combustor 65 is provided to combust this proportion of produced hydrogen.

As previously, the stack 1 is presented with compressed air and steam at respective anode 1a and cathode 1b sides of the stack 1. The ejector 2 provides the cathode 1b with recycled hydrogen to the cathode 1b inlet. The ejector 3 provides for air recycling through the kink 43 which incorporates the off gas combustor 65. As indicated previously, this combustor 65 burns a small faction of the produced hydrogen and the heat is then passed through the loop 43 for amalgamation in the ejector 3 with the compressed air flow 35, which in turn is presented to the anode 1*a* of the stack 1. This combination is then presented as the feed to the anode 1*a*. As previously, a steam generator 6 is provided which evaporates water utilising the exhaust from the turbine 4. A condenser 7 of the water entrained in the electrolysis apparatus product acts as an economiser to the water/steam feed to the water electrolyser. A steam super heater 8 is provided in order to provide steam to the ejector 2 for amalgamation with the recycled hydrogen from the cathode 1*b* of the stack 1. The feed pump 9 and demineralisation/de-aeration apparatus again operate on the water supply in order to ensure that it is acceptable.

It will be apparent that increasing the amount of stack per unit air would allow operation of the stack at a higher temperature and therefore higher efficiency. However, for a self sustaining system the maximum amount of stack per unit compressed air flow rate is imposed by the maximum steam flow rate sensible from heat recovery from a gas turbine exhaust only. Addition of an auxiliary fired steam generator or integration of an external incident heat source even at relatively low temperatures since the heat is only needed for steam generation, will increase the efficiency of the overall electrolysis apparatus.

Certain aspects of the present invention utilise incident heat to increase the temperature of the air feed to the stack in order to compensate for reduced electrical power input which will generally be more expensive to provide. Generally the minimum required temperature to allow use of incident process heat by direct input to the stack in accordance with the embodiment depicted in FIG. 2 will be in the order of 600° C., but hybrid arrangements including externally source and off gas burning as described in subsequent embodiments or exploitation of process heat for steam generation only can widen the range of possible applications such that the incident process heat source may only need to provide in the order of 30° C. for integration. In such circumstances possibly incident processors which may allow integration with the present system to provide the heat vector for the heat exchange will include Refinery and chemical processors
High temperature nuclear reactors
Gas turbine cycles
Combined heat and power plants
Waste incineration
Solar power sources It will be understood in addition to production of hydrogen via a steam electrolysis process, solid oxide electrolysis processes can be applied to a number of the technical fields including:

a) Electrolysis of several process by-products suitable for electro chemical splitting using an oxygen ion conducting membrane to enhance desired product content.

b) Oxygen and hydrogen co-production by electrolysis of water. A possible way for air enrichment in oxygen would be the design of a closed air loop including the gas turbine with an ambient air "make up" at the compressor inlet and drawing of an oxygen rich stream at the turbine outlet. In principle a close circuit could be designed on the stack anode side and filled in with pure oxygen at the start. This system would operate with the oxygen on the anode side and produce high purity oxygen which would be a sellable by-product. However, this arrangement would have big safety issues to ensure a tight separation between the oxygen and hydrogen rich streams in every part of the apparatus in order to avoid the potential for explosions etc.

The present apparatus also may allow regenerative fuel cell operation using peak electrical power, that is to say the coupling of renewable power sources to provide via electrolysis the fuel to be consumed in the fuel cell when required.

Modifications and alterations to the present invention will be understood by those skilled in the art. Thus, as indicated, typically a number of stacks will be provided within a pressure vessel and the operating temperatures/electrical inputs varied in order to provide a most efficient and economic process.

It will be understood that where mentioned anode and cathode re-circulations are carried out using ejector arrangements or devices including a blower or any other appropriate mechanism.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:

1. An electrolysis apparatus for production of a product, the apparatus comprising:
an electrolysis cell operable at 800-1000° C. and constructed to provide the product at a cathode in a stack by electrolysis, the electrolysis cell being used to generate the product by presentation of a feed to the cathode and an air feed to an anode with electrical power presented by a power source between the anode and cathode, wherein air is driven towards the stack by a turbine engine, the air for the stack is pre-heated before presentation to the electrolysis cell using an incident heat source, and a proportion of air coming out of the stack is re-circulated to the anode of the stack during use.

2. The apparatus according to claim 1, wherein the incident heat source is provided by combustion of a proportion of the product generated in a combustor.

3. The apparatus according to claim 2, wherein the proportion of the product combusted in the combustor is in an air recycle loop.

4. The apparatus according to claim 2, wherein the proportion of air re-circulated to the anode of the stack is supplied to the combustor to combust the proportion of the product in the combustor and a combustor exhaust is connected to the anode of the stack to pre-heat the air.

5. The apparatus according to claim 1, wherein the air is compressed and pre-heated to a temperature of 500-800° C.

6. The apparatus according to claim 5, wherein the air is heated by a heat exchanger.

7. The apparatus according to claim 1, wherein a proportion of the product coming out of the stack is re-circulated to the cathode of the stack.

8. The apparatus according to claim 7, wherein the proportion of the product re-circulated to the cathode of the stack maintains a reducing environment in the stack.

9. The apparatus according to claim 1, wherein a recovery arrangement is provided to receive heat from a turbine engine exhaust to generate the incident heat for the stack.

10. The apparatus according to claim 1, wherein a separator is provided to separate products flows from the stack.

11. The apparatus according to claim 1, wherein the incident heat source is provided by processed heat from the power source of another process.

12. The apparatus according to claim 1, wherein the incident heat source is provided by processed heat from the power source of other process.

13. The apparatus according to claim 1, further comprising an evaporator configured to evaporate the feed, a super heater configured to super heat the feed, such that when a proportion of air coming out of the stack is used to drive a turbine of a turbine engine, the evaporator is heated by the proportion of air which has passed through the turbine and the super heater is heated by the product coming out of the stack.

14. The apparatus according to claim 1, further comprising:
 a heat exchanger;
 a first evaporator configured to evaporate the feed;
 a second evaporator configured to evaporate the feed;
 a pre-heater configured to heat the feed; and
 a compressor of a turbine engine, wherein the compressor of the turbine engine is configured to compress the air and the heat exchanger is configured to heat the air, the heat exchanger is configured to supply a thermal vector to the second evaporator and the pre-heater is configured to be heated by air provided by the first evaporator and provide pre-heated feed to the first evaporator and the second evaporator.

15. The apparatus according to claim 14, wherein the first and second evaporators supply feed to a super heater.

16. A water electrolysis apparatus for production of hydrogen, the apparatus comprising:
 an electrolysis cell operable at 800-1,000° C. and constructed to provide hydrogen product at a cathode in a stack by electrolysis, the electrolysis cell being used to generate the hydrogen product by presentation of a steam feed to an anode and an air feed to a cathode with electrical power presented by a power source between the anode and cathode, wherein air is driven towards the stack by a turbine engine, the air for the stack is pre-heated before presentation to the electrolysis cell using an incident heat source, and a proportion of air coming out of the stack is re-circulated to an anode of the stack during use.

17. The apparatus according to claim 16, wherein the incident heat source is provided by combustion of a proportion of the product generated in a combustor.

18. The apparatus according to claim 17, wherein the proportion of the product combusted in the combustor is in an air recycle loop.

19. The apparatus according to claim 18, wherein the proportion of air re-circulated to the anode of the stack is supplied to the combustor to combust the proportion of the product in the combustor and a combustor exhaust is connected to the anode of the stack to pre-heat the air.

20. The apparatus according to claim 17, further comprising:
 an evaporator configured to evaporate the feed; and
 a super heater configured to super heat the feed, such that when a proportion of air coming out of the stack is used to drive a turbine of a turbine engine, the evaporator is heated by the proportion of air which has passed through the turbine and the super heater is heated by the product coming out of the stack.

21. The apparatus according to claim 17, further comprising:
 a heat exchanger;
 a first evaporator configured to evaporate the feed;
 a second evaporator configured to evaporate the feed;
 a pre-heater configured to heat the feed; and
 a compressor of a turbine engine, wherein the compressor of the turbine engine is configured to compress the air and the heat exchanger is configured to heat the air, the heat exchanger is configured to supply a thermal vector to the second evaporator and the pre-heater is configured to be heated by air provided by the first evaporator and provide pre-heated feed to the first evaporator and the second evaporator.

22. The apparatus according to claim 21, wherein the first and second evaporators supply feed to a super heater.

23. The apparatus according to claim 16, wherein the air is compressed and pre-heated to a temperature of 500-800° C.

24. The apparatus according to claim 23, wherein the air is heated by a heat exchanger.

25. The apparatus according to claim 16, wherein a proportion of the product coming out of the stack is re-circulated to the cathode of the stack.

26. The apparatus according to claim 25, wherein the proportion of the product re-circulated to the cathode of the stack maintains a reducing environment in the stack.

27. The apparatus according to claim 16, wherein a recovery arrangement is provided to receiving heat from a turbine engine exhaust to generate the incident heat for the stack.

28. The apparatus according to claim 16, wherein a separator is provided to separate products flows from the stack.

* * * * *